Nov. 20, 1934.  J. B. STRAUSS  1,981,206
HIGHWAY PATH INDICATOR
Filed Dec. 9, 1932
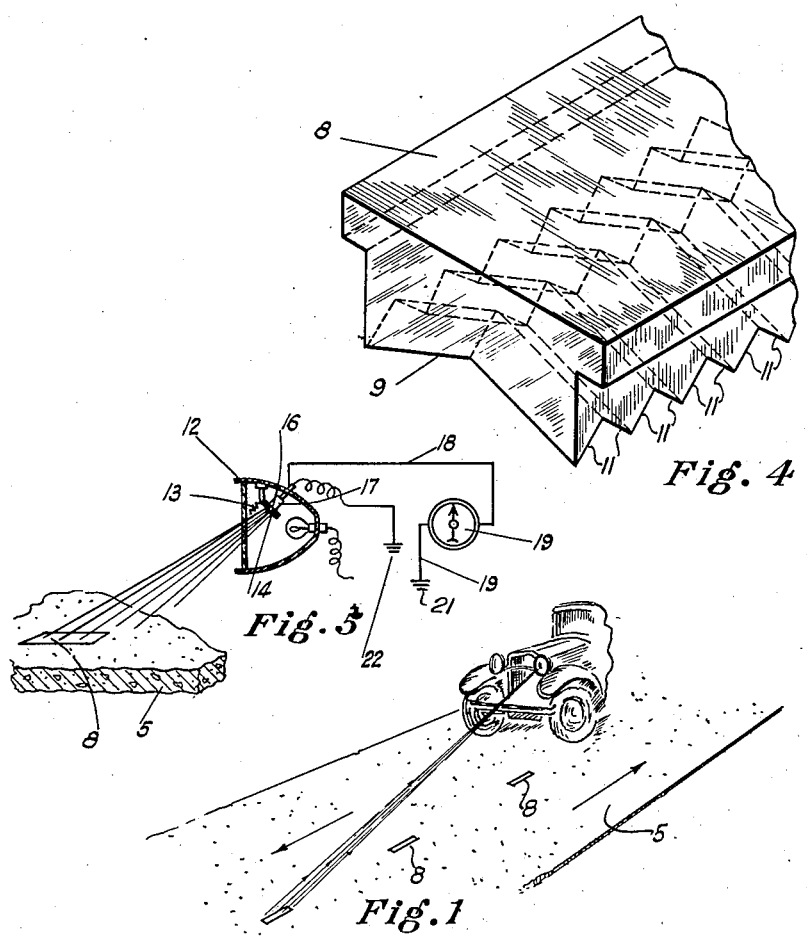
INVENTOR.
Joseph B. Strauss.
BY
ATTORNEY Patented Nov. 20, 1934

1,981,206

UNITED STATES PATENT OFFICE 1,981,206

HIGHWAY PATH INDICATOR

Joseph B. Strauss, San Francisco, Calif.

Application December 9, 1932, Serial No. 646,500

1 Claim. (Cl. 88—1)

This invention relates to improvements in highway path indicators.

The principal object of the invention is to provide means for indicating to the driver of a vehicle the pathway over which the vehicle is to travel.

A further object is to provide means whereby the driver may known at all times, irrespective of other light conditions, whether he is on the right side of the highway or not.

A further object is to provide means whereby this indication may be received by the driver without incurring heavy expense either in equipping the highway or the vehicle.

A still further object is to produce a device wherein all vehicles will illuminate the marker to some degree, irrespective of whether they have a special apparatus mounted upon the vehicle.

Other objects and advantages will be apparent during the course of the following description.

In the accompanying drawing forming a part of this specification and in which like numerals are employed to designate like parts throughout the same, Fig. 1 is a perspective view indicating the manner in which the markers are positioned upon a highway, and the manner in which a beam of light from a vehicle impinges upon the markers, Fig. 2 is a fragmentary detail cross sectional perspective view showing one form of continuous marker, Fig. 3 is a view similar to Fig. 2, showing a modified form of block marker, Fig. 4 is an enlarged fragmentary perspective view showing the construction of the marker employed in Fig. 3, and Fig. 5 is a cross sectional view of the vehicle apparatus for directing light to one of the markers and for indicating, through reflected light, to the driver whether the vehicle is upon its proper course.

Applicant is aware of the fact that lines have been painted on a highway and that white-surfaced bricks have been employed upon highways for indicating certain boundaries over which the vehicle must travel. Applicant's device, while serving a similar purpose, is quite different in that he employs a surface having incorporated therewith a chemical which is radio active and, therefore, one which will absorb from the sun or daylight certain rays which when activated will glow at night. There are several of these chemicals which are well known, such as phosphorus, and a number of radium salts which are now commercially procurable and at a reasonable cost. By impregnating a marker strip or marker blocks with this material, or by employing a transparent block such as glass and placing beneath the undersurface such a chemical, then when a vehicle passes in close proximity thereto so that the rays of illumination from the headlights will reflect back to the operator of the vehicle a peculiar light, he will be guided upon the right path. With vehicles equipped with a special apparatus, it is possible for him to throw a beam of light ahead of the vehicle, which beam of light is composed of invisible rays, which rays when striking upon the phosphorescent material will activate this material to reflect rays, which will affect a photo-electric cell for the purpose of operating an indicator. It will, therefore, be apparent that my device may be used either with ordinary headlights or with the apparatus using the invisible rays.

In the accompanying drawing wherein for the purpose of illustration is shown a preferred embodiment of my invention, the numeral 5 designates a highway upon which it is desired to indicate definite points, as for instance, to divide the highway for travel in both directions. This highway is preferably made of pre-cast slabs. This may be accomplished in several ways (two of which have been indicated). In Fig. 2, I have shown the highway 5 provided with a channel 6, in which is placed a precast strip 7. This strip 7 is composed of a plastic material in which is incorporated chemical substances, which are radio active. In Fig. 3, I have shown the highway provided with blocks 8, which blocks are best illustrated in Fig. 4, where it will be noted that the undersurface of the block is V-shaped as shown at 9, looking from end to end. This V-shaped surface is further formed so as to fashion inclined faces 11. These faces form reflecting surfaces through the block which is made of a transparent material.

In Fig. 5, I have shown a headlight designated as a whole by the numeral 12, which headlight has positioned therein a glow element 13 which is mounted adjacent a reflector 14, which reflector has an opening 16 therethrough, to the rear of which is mounted a photo-electric cell 17. This cell is connected by a wire 18 to one side of an indicator 19, the opposite side of which is grounded as at 21 and also the opposite side of the photo-electric cell is grounded at 22. Therefore, when the glow element 13 is excited the rays therefrom will be reflected from the reflector 14 onto one of the highway markers 8, and will be reflected therefrom back through the opening 16 thus impinging upon the photo-electric cell 17 and thus causing the pointer of the indicator 19 to move to a certain position indicating that the vehicle is on the right path. Damping means may be provided so that the indicator will not move too violently in passing from one block to the next.

The operation of my device is as follows:—

When a highway is equipped with a strip as shown in Fig. 2, the headlights of a vehicle will excite the radio active material and therefore the strip will be visible to the driver through the peculiar glow returned through the reflection. This glow is of such a nature that it will be visible at all times, whereas the ordinary white line now employed is often invisible due to the blinding effect of on-coming headlights, and it is to overcome this objection that applicant has devised his invention.

When the form used in Fig. 3 is employed, the same effect will take place with the exception that the inclined surfaces 11 permit the chemical to be embedded and fully protected from the weather, yet due to the transparent material of the blocks 8 this chemical radio action will be visible through the blocks to the driver. The operation of the invisible ray, as shown in Fig. 5, has already been described.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

A transparent light transmitting element adapted to be positioned in a highway to define a definite path of travel for a motor vehicle, comprising an elongated substantially rectangular body, being cut away adjacent its upper surface to provide a pair of lateral shoulders and having a V shaped bottom surface extending from end to end thereof, the opposite sides of said V shaped bottom surface being further formed with V shaped serrations extending in a general direction from side to side of said body, said serrations forming flat inclined reflecting surfaces.

JOSEPH B. STRAUSS.